United States Patent [19]

Snyder et al.

[11] Patent Number: 4,997,107
[45] Date of Patent: Mar. 5, 1991

[54] DISPOSABLE GREASE TUBE

[76] Inventors: Walter F. Snyder; Arlene P. Snyder, both of 4201 S. 31st St., Apt. 246, Arlington, Va. 22206

[21] Appl. No.: 529,562
[22] Filed: May 29, 1990
[51] Int. Cl.⁵ .............................................. B65D 35/32
[52] U.S. Cl. ...................................... 222/99; 222/97; 222/107; 222/568
[58] Field of Search .................... 222/92, 95, 97–99, 222/105, 566–570

[56] References Cited

U.S. PATENT DOCUMENTS

| D. 38,579 | 5/1907 | Blood, Jr. | 222/92 X |
| 626,021 | 5/1899 | Gerdom | 222/99 |
| 1,407,997 | 2/1922 | Gregory | 222/99 |
| 1,672,602 | 6/1928 | Creveling | 222/99 |
| 1,894,152 | 1/1933 | Bolz | 222/99 |
| 1,987,428 | 1/1935 | Whiteman | 222/99 |
| 1,996,792 | 4/1935 | Bystricky et al. | 222/95 |
| 2,077,715 | 4/1937 | Rubens | 222/99 |
| 2,635,787 | 4/1953 | Bryant | 222/95 |
| 2,838,207 | 6/1958 | Freed | 222/99 |
| 2,903,162 | 9/1959 | Regan | 222/99 |

FOREIGN PATENT DOCUMENTS 25597 of 1898 United Kingdom .................. 222/99

Primary Examiner—Kevin P. Shaver
Attorney, Agent, or Firm—Leon Gilden

[57] ABSTRACT

A grease tube defined by a deformable body, including a forward tube nozzle and a key member to effect a winding and pressurizing of the body, with a dispensing nozzle selectively and securably mounted in a threaded inter-relationship to a forward nozzle of the tube body. Modifications of the invention include a matrix of roughened projections, or alternatively a matrix of suction cups integrally cast to the tube body to enhance frictional engagement of the tube during pressurizing thereof.

1 Claim, 4 Drawing Sheets ial to direct lubricating material therefrom.

DISPOSABLE GREASE TUBE

BACKGROUND OF THE INVENTION

1. Field of the Invention

The field of invention relates to grease dispensing apparatus, and more particularly pertains to a new and improved disposable grease tube wherein the same utilizes a tube and nozzle arrangement to dispense grease into associated grease accepting portions of various relatively movable mechanical components.

2. Description of the Prior Art

Grease dispensing organizations of the prior art are typically of a relatively elaborate, mechanical linkage association to effect pressurizing of grease to be dispensed therefrom. The instant invention attempts to overcome deficiencies of the prior art by providing a conveniently transported and configured tube dispensing arrangement wherein the same permits disposal of the tube subsequent to dispensing of grease therefrom. Examples of the prior art include U.S. Pat. No. 1,437,169 to Critchlow utilizing an elongate cylinder with a rotatable boss directed therethrough to effect projection of a plunger throughout the cylinder to pressurize the cylinder and effect lubricant flow therefrom.

U.S. Pat. No. 1,591,038 to Hill sets forth a grease gun arrangement utilizing a plunger member to effect pressurizing of grease from the grease gun of the organization.

U.S. Pat. No. 1,602,543 to Martin utilizes a grease gun with a piston mounted to a threaded boss, wherein the threaded boss is longitudinally directed through the grease gun body to effect pressurizing of the body and discharge of grease therefrom.

U.S. Pat. No. 1,690,400 to Carr utilizes a lubricating, generally cylindrical body, utilizing a plunger to effect pressurizing of the body.

U.S. Pat. No. 4,298,144 to Pressl sets forth a grease gun utilizing a linkage member to effect levering and mechanical advantage in pressurizing of grease within the grease gun container body to effect discharge of grease therefrom.

As such, it may be appreciated that there continues to be a need for a new and improved disposable grease tube wherein the same addresses both the problems of ease of use, as well as effectiveness in construction in directing a flow of grease from a disposable grease dispensing tube and this respect, the present invention substantially fulfills this need.

SUMMARY OF THE INVENTION

In view of the foregoing disadvantages inherent in the known types of grease dispensing apparatus now present in the prior art, the present invention provides a disposable grease tube wherein the same provides for a deformable grease tube body that is pressurized by use of a wind-up key to direct a flow of grease through a separately securable nozzle mounted to the deformable body to effect a directing of grease therefrom. As such, the general purpose of the present inVention, which will be described subsequently in greater detail, is to provide a new and improved disposable grease tube which has all the advantages of the prior art grease tube apparatus and none of the disadvantages.

To attain this, the present invention provides a grease tube defined by a deformable body, including a forward tube of the body, with a dispensing nozzle selectively and securably mounted in a threaded inter-relationship to a forward nozzle of the tube body. Modifications of the invention include a matrix of roughened projections, or alternatively a matrix of suction cups integrally cast to the tube body to enhance frictional engagement of the tube during pressurizing thereof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disposable grease tube which has all the advantages of the prior art grease tube apparatus and none of the disadvantages.

It is another object of the present invention to provide a new and improved disposable grease tube which may be easily and efficiently manufactured and marketed.

It is a further object to the present invention to provide a new and improved disposable grease tube which is of a durable and reliable construction.

An even further object of the present invention is to provide a new and improved disposable grease tube which is susceptible of a low cost of manufacture with regard to both materials and labor, and which accordingly is then susceptible of low prices of sale to the consuming public, thereby making such disposable grease tubes economically available to the buying public.

Still yet another object of the present invention is to provide a new and improved disposable grease tube which provides in the apparatuses and methods of the prior art some of the advantages thereof, while simultaneously overcoming some of the disadvantages normally associated therewith.

Still another object of the present invention is to provide a new and improved disposable grease tube wherein the same permits a disposable grease tube arranged for pressurization through the use of a key member to provide a winding of the tube about the key effecting pressurization of the associated tube body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
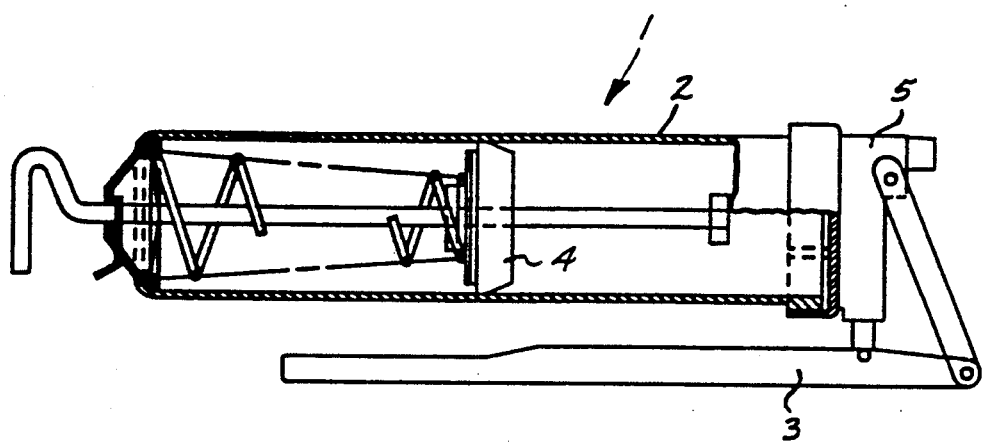
FIG. 1 is an orthographic cross-sectional view of a prior art grease tube apparatus.
Figure 2:
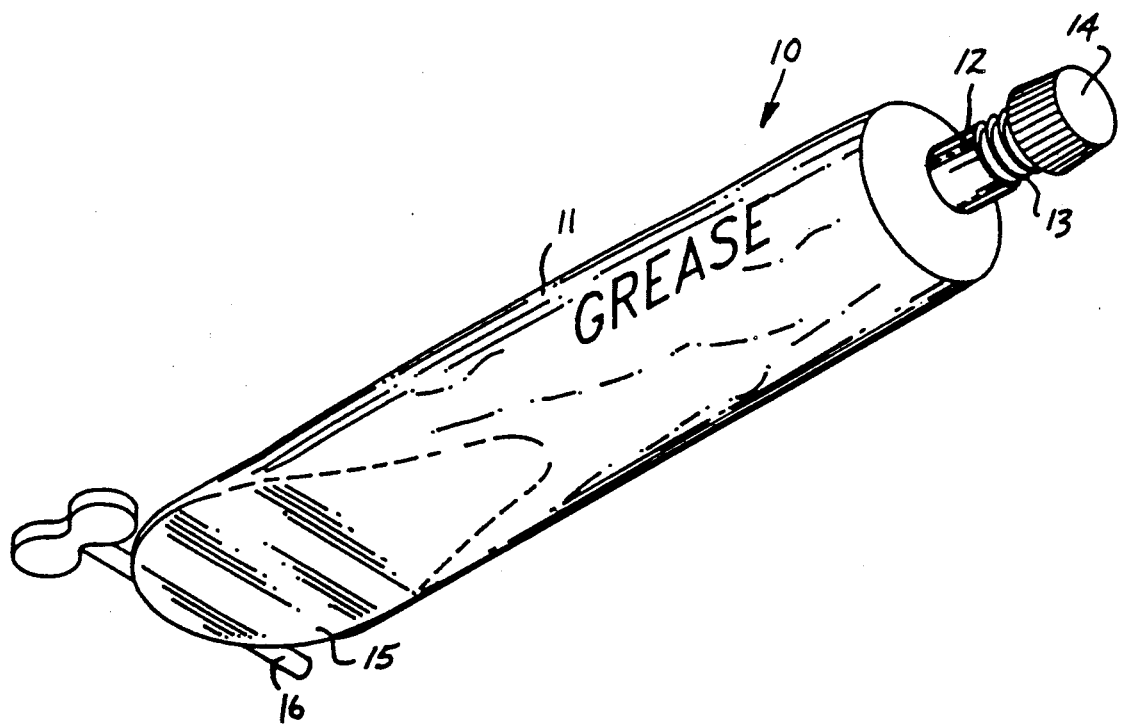
FIG. 2 is an isometric illustration of the grease tube of the instant invention.
Figure 3:
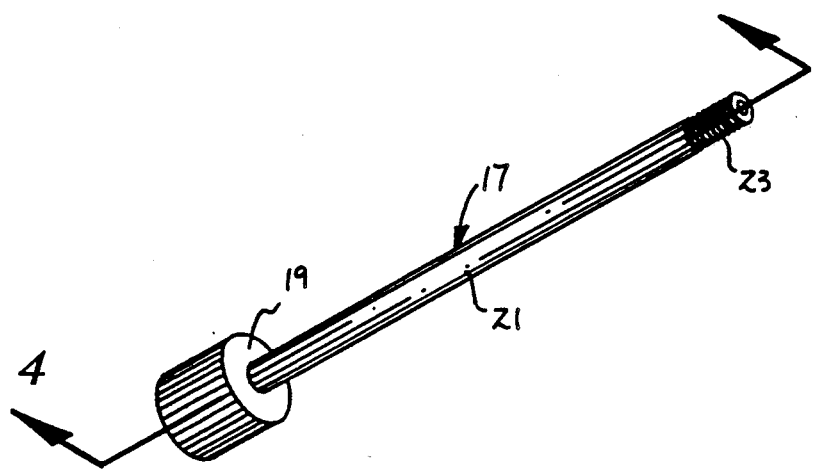
FIG. 3 is an isometric illustration of the nozzle member of the instant invention.
Figure 4:
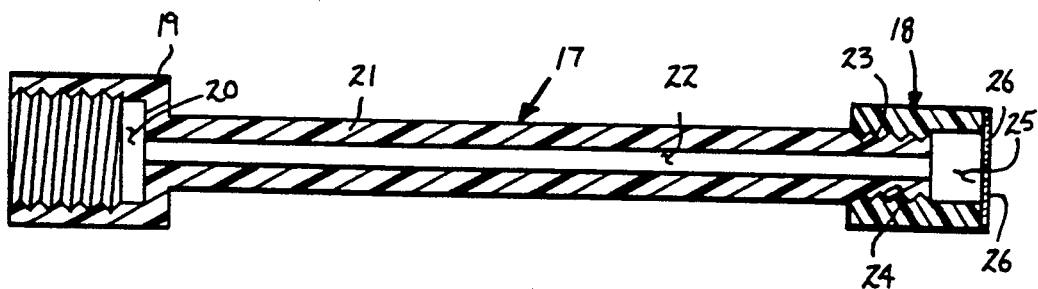
FIG. 4 is an orthographic cross-sectional view of the nozzle member, taken along the lines 4—4 of FIG. 3, in association with a grease fitting coupler.
Figure 5:
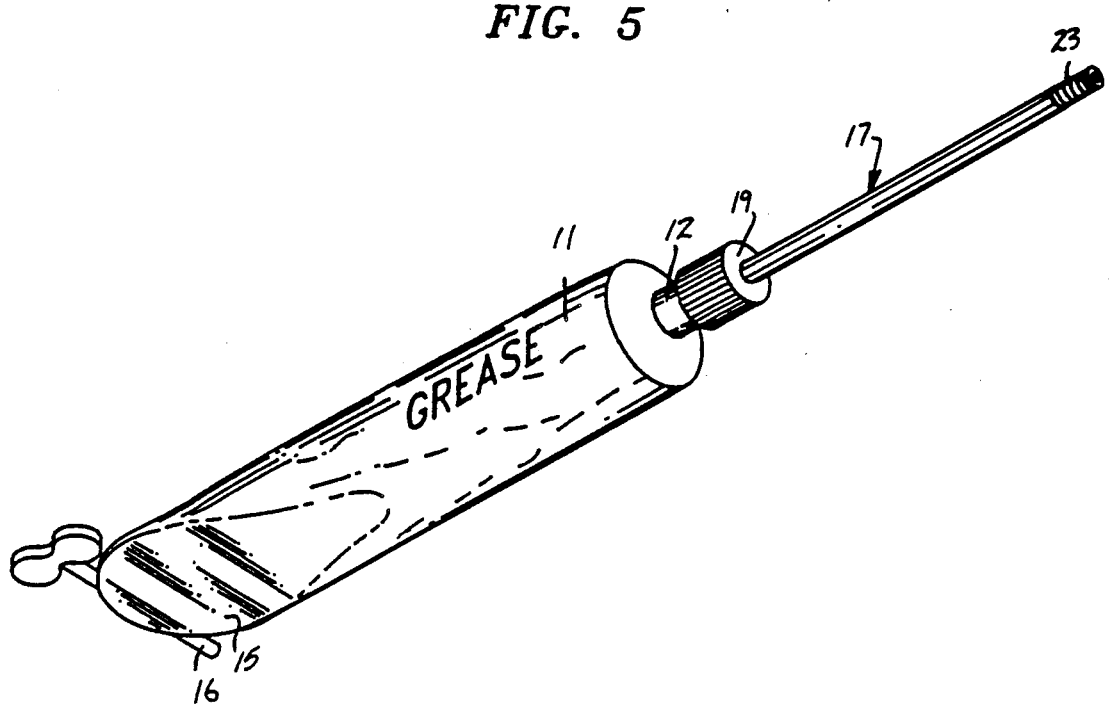
FIG. 5 is an isometric illustration of the instant invention and associated nozzle mounted thereon.

With reference now to the drawings, and in particular to FIGS. 1 to 8 thereof, a new and improved disposable grease tube embodying the principles and concepts of the present invention and generally designated by the reference numeral 10 will be described.

FIG. 1 illustrates a prior art grease gun apparatus 1, wherein a rigid body 2 includes a lever 3 to effect discharge of grease from the apparatus through a discharge port member 5, wherein the grease is maintained within the body of the apparatus by a cup member 4.

Figure 6:
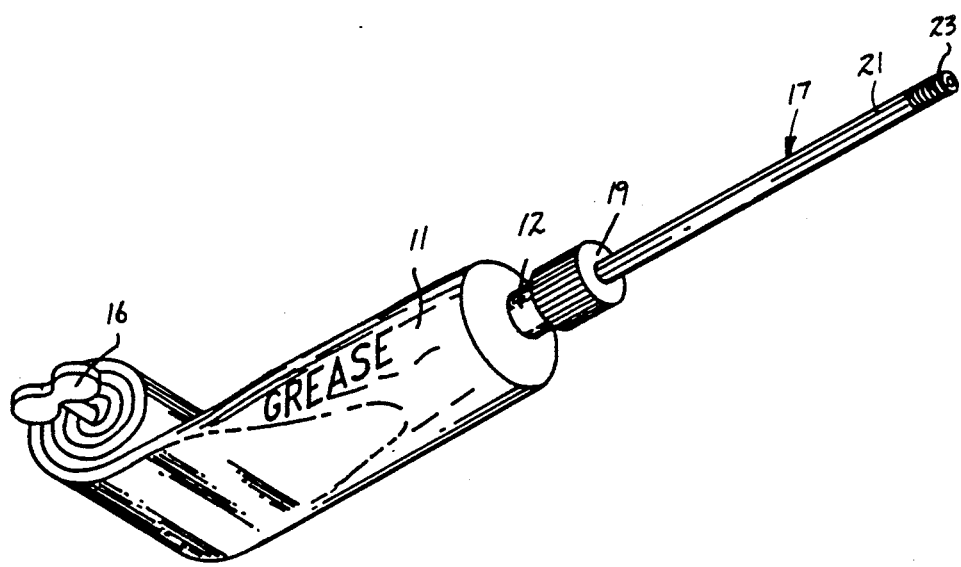
FIG. 6 is an isometric illustration of the grease tube and associated nozzle with the tube wound about the associated key.

More specifically, the disposable grease tube 10 of the instant invention essentially comprises a deformable, elongate longitudinally aligned body 11, including a tube nozzle 12 coaxially mounted at a forward end of the body, with a threaded upper tube nozzle 13 mounting a removable cap 14 thereon. A planar rear tube end portion 15 includes a wind-up key 16 integrally mounted thereto to permit winding of the rear tube end portion 15 about the key effecting pressurizing of the body 11, in a manner as illustrated in FIG. 6 for example. A dispensing nozzle 17 is selectively mounted to the nozzle 12 about the threaded upper tube nozzle portion 13, including an internally threaded securement boss 19, with a boss cavity 20 formed therewithin, wherein the boss cavity 20 is in communication with a rigid nozzle tube 21 that is formed with a longitudinally aligned cylindrical cavity 22 directing grease expressed from the body 11 through the cavity 22 and through a forward end of the dispensing nozzle 17. The forward end of the dispensing nozzle includes a threaded nozzle upper end 23 permitting securement to various components or selectively to an internally threaded grease fitting cap 18 that includes internal threads 24 formed with grease fitting cavity 25 in coaxial communication with the cylindrical cavity 22, including securement plates 26 mounted about an entrance end of the grease fitting cap 18 to secure a grease fitting therewithin to receive grease directed through the cylindrical cavity 22.

Figure 7:
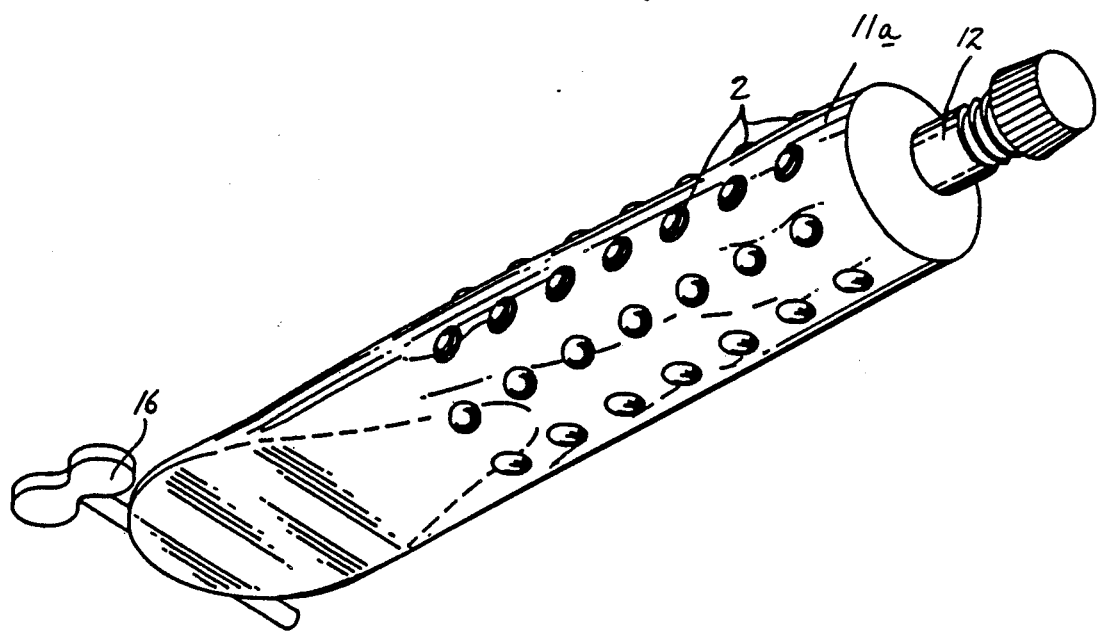
FIG. 7 is an isometric illustration of a modified tube body of the instant invention.
Figure 8:
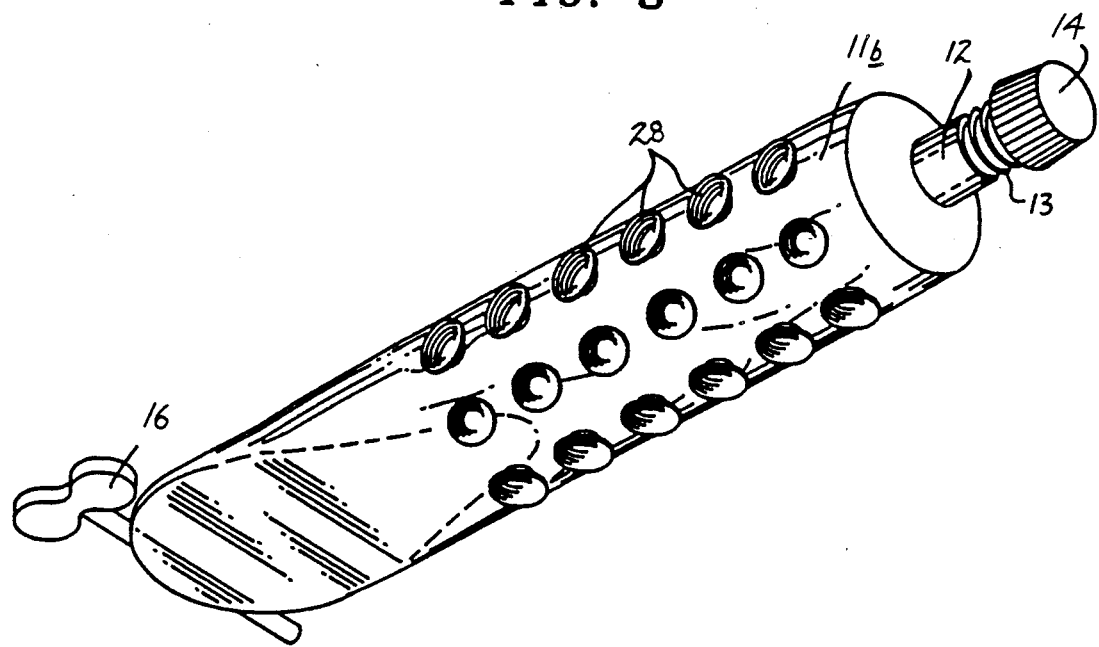
FIG. 8 is an isometric illustration of a further modified tube body of the instant invention.

FIG. 7 illustrates a modified body 11a, including a matrix of integrally cast roughened projections 27 formed about the tube body to enhance gripping thereof. Alternatively, FIG. 8 illustrates the use of a matrix of internally cast suction cups 28 formed about the surface of the further modified tube 11b to effect a vacuum engagement with a hand grasping the tube by a user thereof.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A disposable grease tube apparatus comprising, in combination, an elongate, longitudinally aligned deformable body, the body including a tube nozzle mounted medially of a forward end of the body, and the body including a wind-up key integrally mounted to a rear end portion of the body to effect a winding of the body and associated pressurizing of the body, and including a dispensing nozzle, the dispensing nozzle selectively securable to the tube nozzle, the dispensing nozzle including a securement boss, the securement boss selectively securable to the tube nozzle, the securement boss including an elongate nozzle tube, the nozzle tube including a cylindrical cavity in communication with the securement boss, and the nozzle tube including a threaded nozzle upper end, and the tube nozzle includes a tube nozzle threaded upper end, and a removable cap selectively securable to the tube nozzle threaded upper end, and the securement boss including an internally threaded cavity, the internally threaded cavity selectively securable to the tube nozzle threaded upper end, and wherein the nozzle tube is rigid, and
including a grease fitting cap, the grease fitting cap including an internally threaded grease fitting cap cavity, the internally threaded grease fitting cap cavity securable to the threaded nozzle upper end, and the grease fitting cap cavity further including a further cavity portion within the grease fitting cap to receive a grease fitting therewithin, and including securement plates mounted about the entrance to the grease fitting cap cavity to effect securement of a grease fitting directed through the securement plates, and the body includes a matrix of integrally cast suction cups formed about the body to effect a vacuum engagement with manual grasping of the body, and wherein the body includes a planar rear tube end portion, and the planar rear tube portion including the wind-up key integrally mounted thereto, wherein the wind-up key is orthogonally aligned relative to an axis defined by the longitudinally aligned body.

* * * * *